(12) United States Patent
Staab et al.

(10) Patent No.: US 11,513,698 B2
(45) Date of Patent: Nov. 29, 2022

(54) ROOT OF TRUST ASSISTED ACCESS CONTROL OF SECURE ENCRYPTED DRIVES

(71) Applicant: Raytheon Company, Waltham, MA (US)

(72) Inventors: Torsten Staab, Bristow, VA (US); Nathan T. Palmer, Austin, TX (US)

(73) Assignee: Raytheon Company, Waltham, MA (US)

( * ) Notice: Subject to any disclaimer, the term of this patent is extended or adjusted under 35 U.S.C. 154(b) by 225 days.

(21) Appl. No.: 16/832,216

(22) Filed: Mar. 27, 2020

(65) Prior Publication Data

US 2020/0310662 A1    Oct. 1, 2020

Related U.S. Application Data

(60) Provisional application No. 62/827,410, filed on Apr. 1, 2019.

(51) Int. Cl.
| | | |
|---|---|---|
| *G06F 3/06* | (2006.01) | |
| *G06F 21/44* | (2013.01) | |
| *G06F 21/57* | (2013.01) | |
| *H04L 9/40* | (2022.01) | |

(52) U.S. Cl.
CPC ............ *G06F 3/0622* (2013.01); *G06F 3/067* (2013.01); *G06F 3/0637* (2013.01); *G06F 21/44* (2013.01); *G06F 21/57* (2013.01); *H04L 63/1416* (2013.01)

(58) Field of Classification Search
CPC ...... G06F 3/0637; G06F 3/0622; G06F 3/067; G06F 21/57; G06F 21/44; H04L 63/1416
See application file for complete search history.

(56) References Cited

U.S. PATENT DOCUMENTS

| | | |
|---|---|---|
| 6,473,857 B1 | 10/2002 | Panas et al. |
| 7,260,555 B2 | 8/2007 | Rossmann et al. |
| 9,251,343 B1 | 2/2016 | Vincent et al. |

(Continued)

FOREIGN PATENT DOCUMENTS

| | | |
|---|---|---|
| EP | 1 764 721 A2 | 3/2007 |
| EP | 3 422 661 A1 | 1/2019 |

(Continued)

OTHER PUBLICATIONS

Response to Non-Final Office Action filed Sep. 27, 2021 for U.S. Appl. No. 16/371,191; 11 Pages.

(Continued)

*Primary Examiner* — Ernest Unelus
(74) *Attorney, Agent, or Firm* — Daly, Crowley, Mofford & Durkee, LLP

(57) ABSTRACT

A system for data protection includes a computing device comprising a processor, a Hardware Root of Trust (HRoT) module and a storage device. The HRoT device is configured to: validate integrity of the computing device; authenticate the computing device to communicate with the storage device; and take over control of storage device access and behaviour whenever suspicious or unauthorized data access from local or remote computing devices is detected. The HRoT device is further configured to, in response to detecting a security risk to at least one of the computing device and the storage device, block communication of the storage device.

15 Claims, 4 Drawing Sheets

(56) References Cited

U.S. PATENT DOCUMENTS

| | | | |
|---|---|---|---|
| 9,319,380 | B2 | 4/2016 | Lukacs et al. |
| 9,509,587 | B1 | 11/2016 | Marquardt et al. |
| 9,600,291 | B1 | 3/2017 | Atsatt |
| 9,626,512 | B1 | 4/2017 | Brandwine et al. |
| 10,027,717 | B2 | 7/2018 | Ben-Shalom et al. |
| 2004/0003262 | A1 | 1/2004 | England et al. |
| 2004/0177260 | A1 | 9/2004 | Gilfix et al. |
| 2005/0138409 | A1 | 6/2005 | Sheriff et al. |
| 2006/0015748 | A1 | 1/2006 | Goto et al. |
| 2006/0026417 | A1 | 2/2006 | Furusawa et al. |
| 2007/0276878 | A1 | 11/2007 | Zheng et al. |
| 2008/0307488 | A1 | 12/2008 | Hammond, II et al. |
| 2009/0204964 | A1 | 8/2009 | Foley et al. |
| 2010/0070743 | A1 | 3/2010 | Grigor et al. |
| 2010/0250796 | A1 | 9/2010 | Jevans et al. |
| 2011/0302638 | A1 | 12/2011 | Cha et al. |
| 2014/0068275 | A1 | 3/2014 | Swanson et al. |
| 2014/0298026 | A1 | 10/2014 | Isozaki et al. |
| 2015/0012737 | A1 | 1/2015 | Newell |
| 2016/0125187 | A1 | 5/2016 | Oxford |
| 2016/0147996 | A1 | 5/2016 | Martinez |
| 2016/0162669 | A1 | 6/2016 | Mikhailov et al. |
| 2016/0378996 | A1 | 12/2016 | Smith et al. |
| 2017/0104770 | A1 | 4/2017 | Jreij et al. |
| 2017/0116440 | A1 | 4/2017 | Huang et al. |
| 2017/0132417 | A1 | 5/2017 | Martinez |
| 2017/0180318 | A1 | 6/2017 | Lutas et al. |
| 2017/0206034 | A1* | 7/2017 | Fetik .................... G06F 3/0604 |
| 2017/0213053 | A1 | 7/2017 | Areno et al. |
| 2017/0364685 | A1 | 12/2017 | Shah et al. |
| 2018/0004953 | A1 | 1/2018 | Smith, II et al. |
| 2018/0034793 | A1 | 2/2018 | Kibalo et al. |
| 2018/0089425 | A1 | 3/2018 | Trikalinou |
| 2018/0109538 | A1 | 4/2018 | Kumar et al. |
| 2018/0165448 | A1 | 6/2018 | Nightingale et al. |
| 2018/0255077 | A1 | 9/2018 | Paine |
| 2018/0260009 | A1 | 9/2018 | Roeder |
| 2018/0278418 | A1 | 9/2018 | Chang et al. |
| 2018/0365425 | A1 | 12/2018 | Packer Ali et al. |
| 2019/0042516 | A1 | 2/2019 | Browning et al. |
| 2019/0050604 | A1 | 2/2019 | Weber et al. |
| 2019/0073478 | A1 | 3/2019 | Khessib et al. |
| 2019/0253417 | A1* | 8/2019 | Kim ..................... H04L 9/3278 |
| 2019/0266331 | A1 | 8/2019 | Sanchez Diaz et al. |
| 2019/0305938 | A1 | 10/2019 | Sandberg-Maitland et al. |
| 2019/0311126 | A1 | 10/2019 | Areno et al. |
| 2019/0334919 | A1 | 10/2019 | Le Roy |
| 2020/0082091 | A1 | 3/2020 | Areno et al. |
| 2020/0082092 | A1 | 3/2020 | Areno et al. |
| 2020/0084229 | A1 | 3/2020 | Areno et al. |
| 2020/0125772 | A1* | 4/2020 | Volos .................... G06F 21/602 |
| 2020/0145409 | A1* | 5/2020 | Pochuev ............... H04L 63/061 |
| 2020/0160947 | A1* | 5/2020 | Rasovsky ........... G06F 21/6245 |
| 2021/0034733 | A1 | 2/2021 | Grobelny et al. |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

Response to Non-Final Office Action filed Sep. 29, 2021 for U.S. Appl. No. 16/255,917; 8 Pages.

International Preliminary Report on Patentability dated Oct. 14, 2021 for PCT Application No. PCT/US2020/025195; 7 Pages.

International Preliminary Report on Patentability dated Oct. 14, 2021 for PCT Application No. PCT/US2020/025178; 7 Pages.

Non-Final Office Action dated Apr. 29, 2021 for U.S. Appl. No. 16/398,641; 38 Pages.

Notice of Allowance dated Nov. 12, 2021 for U.S. Appl. No. 16/255,917; 13 Pages.

PCT International Preliminary Report dated Mar. 18, 2021 for International Application No. PCT/US2019/045607; 7 pages.

PCT International Preliminary Report dated Mar. 18, 2021 for International Application No. PCT/US2019/045610; 7 pages.

PCT International Preliminary Report dated Mar. 18, 2021 for International Application No. PCT/US2019/045608; 11 pages.

U.S. Appl. No. 16/722,142, filed Dec. 20, 2019, Hird et al.

U.S. Appl. No. 16/832,192, filed Mar. 27, 2020, Staab.

U.S. Non-Final Office Action dated Dec. 3, 2020 for U.S. Appl. No. 16/371,191; 18 Pages.

U.S. Non-Final Office Action dated Jan. 26, 2021 for U.S. Appl. No. 16/255,917; 26 pages.

PCT International Search Report and Written Opinion dated Jul. 13, 2020 for International Application No. PCT/US2020/025195; 12 Pages.

PCT International Search Report and Written Opinion dated Jul. 14, 2020 for International Application No. PCT/US2019/045610; 12 Pages.

Response to U.S. Non-Final Office Action dated May 14, 2020 for U.S. Appl. No. 16/214,857; Response Filed Jul. 30, 2020; 7 Pages.

PCT International Preliminary Report dated Oct. 22, 2020 for International Application No. PCT/US2019/022879; 9 Pages.

Office Action dated Dec. 27, 2021 for U.S. Appl. No. 16/371,191; 17 Pages.

U.S. Non-Final Office Action dated May 14, 2020 for U.S. Appl. No. 16/214,857; 23 Pages.

PCT International Search Report and Written Opinion dated Jun. 26, 2020 for International Application No. PCT/US2019/045608; 16 Pages.

PCT International Search Report and Written Opinion dated Jun. 25, 2020 for International Application No. PCT/US2020/025178; 12 Pages.

U.S. Non-Final Office Action dated Jul. 2, 2021 for U.S. Appl. No. 16/255,917; 21 pages.

Response to U.S. Non-Final Office Action dated Apr. 29, 2021 for U.S. Appl. No. 16/398,641; Response filed on Jul. 23, 2021; 10 pages.

PCT International Search Report and Written Opinion dated May 31, 2019 for International Application No. PCT/US2019/022879; 16 Pages.

Cooper et al., "BIOS Protection Guidelines," *National Institute of Standards and Technology*—Special Publication 800-147; U.S. Department of Commerce; Apr. 2011; 26 Pages.

Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.

Regenscheid et al., "BIOS Integrity Measurement Guidelines (Draft);" *National Institute of Standards and Technology*—Special Publication 800-155; U.S. Department of Commerce; Dec. 2011; 47 Pages.

Regenscheid, "BIOS Protection Guidelines for Servers;" *National Institute of Standards and Technology*—NIST Special Publication 800-147B; U.S. Department of Commerce; Aug. 2014; 32 Pages.

Trusted Computing Group, "Trusted Platform Module Library, Part 1: Architecture;" Family "2.0", Level 00, Revision 01.16; TCG Published; Oct. 30, 2014; 147 Pages (Part 1 of 2).

Trusted Computing Group, "Trusted Platform Module Library, Part 1: Architecture;" Family "2.0", Level 00, Revision 01.16; TCG Published; Oct. 30, 2014; 121 Pages (Part 2 of 2).

Wilkins et al., "UEFI Secure Boot in Modern Computer Security Solutions;" www.UEFI.org; Sep. 2013; 10 Pages.

PCT International Search Report and Written Opinion dated Aug. 11, 2020 for International Application No. PCT/US2019/045607; 12 Pages.

U.S. Notice of Allowance dated Aug. 24, 2020 for U.S. Appl. No. 16/214,857; 7 Pages.

U.S. Non-Final Office Action dated Jun. 30, 2021 for U.S. Appl. No. 16/371,191; 16 pages.

Response to U.S. Final Office Action dated Mar. 16, 2021 for U.S. Appl. No. 16/371,191; Response filed on Jun. 15, 2021; 11 pages.

Response to U.S. Non-Final Office Action dated Jan. 26, 2021 for U.S. Appl. No. 16/255,917; Response filed on Mar. 23, 2021; 7 pages.

(56) References Cited

OTHER PUBLICATIONS

Response to U.S. Non-Final Office Action dated Dec. 3, 2020 for U.S. Appl. No. 16/371,191; Response filed on Feb. 23, 2021; 8 pages.
U.S. Final Office Action dated Mar. 16, 2021 for U.S. Appl. No. 16/371,191 ;16 pages.
U.S. Notice of Allowance dated Mar. 30, 2022 for U.S. Appl. No. 16/722,142; 12 Pages.
Response filed Jun. 21, 2022 to Non-Final Office Action dated Mar. 28, 2022 for U.S. Appl. No. 16/832,192; 13 Pages.
Non-Final Office Action dated Mar. 28, 2022 for U.S. Appl. No. 16/832,192; 12 pages.

* cited by examiner

ROOT OF TRUST ASSISTED ACCESS CONTROL OF SECURE ENCRYPTED DRIVES

CROSS REFERENCE TO RELATED APPLICATIONS

The present application claims the benefit of U.S. Provisional Patent Application No. 62/827,410, filed on Apr. 1, 2019, which is incorporated herein by reference.

TECHNICAL FIELD

The concepts, systems, circuits, devices and techniques described herein relate generally to security systems and more particularly to security systems providing secure solutions for access control of secure-encrypted drives.

BACKGROUND

For a secure system, remote control and maintenance of secure and self-encrypting drive (SED) devices are important for enterprise use cases where geographically disparate drives must be securely controlled and monitored. In particular, encryption key updates for remote drives are not fully protected against interceptions where the confidentiality of following transactions may be compromised. If the state of the system physically hosting the SED is not trusted, then any updates to the drive cannot be trusted.

SUMMARY

In accordance with the concepts, techniques and systems described herein is an efficient method for providing a secure data protection process. The techniques and systems described herein may provide a combination of distributed (hardware and software) Roots of Trusts (RoT), Self-Encrypting Drive (SED) technologies, multi-level system monitoring, and multi-dimensional machine learning and classification.

In one aspect, a system for data protection comprises: a computing device comprising a processor, a Hardware Root of Trust (HRoT) device and a storage device, wherein the HRoT device is configured to: validate integrity of the computing device; authenticate the computing device to communicate with the storage device; and take over control of the storage device in response to detecting a security risk to at least one of the computing device and the storage device.

A system can further include one or more of the following features: the HRoT device validates integrity of the computing device by validating one or more of a firmware of the computing device, a firmware of operating system running on the computing device, and a kernel space of the operating system, the computing device further comprises Software Root of Trust (RoT) instance running on the processor, the HRoT device provides a Trusted Execution Environment (TEE), the HRoT device loads and executes a security monitoring application in the TEE, the HRoT device, in response to detecting a security risk to at least one of the computing device and the storage device, blocks communication of the storage device, the RoT sends an alert signal to the HRoT device in response to detecting a security attack to at least one of the computing device and the storage device, the storage device comprises a Secure Encrypted Drive (SED), the HRoT device controls data hosted on a cloud-based storage service, NAS, and/or SAN storage, and/or the security risk comprises a suspicious or unauthorized data access from a remote device or from inside of the computing device.

In another aspect, a method of protecting data comprises: employing a computing device comprising a processor, a Hardware Root of Trust (HRoT) device and a storage device, wherein the HRoT device performs the steps of: validating integrity of the computing device; authenticating the computing device to communicate with the storage device; and taking over control of the storage device in response to detecting a security risk to at least one of the computing device and the storage device.

A method can further include one or more of the following features: the HRoT device validates integrity of the computing device by validating one or more of a firmware of the computing device, a firmware of operating system running on the computing device, and a kernel space of the operating system, the computing device further comprises Software Root of Trust (RoT) instance running on the processor, the HRoT device provides a Trusted Execution Environment (TEE), the HRoT device loads and executes a security monitoring application in the TEE, the HRoT device, in response to detecting a security risk to at least one of the computing device and the storage device, blocks communication of the storage device, the RoT sends an alert signal to the HRoT device in response to detecting a security attack to at least one of the computing device and the storage device, the HRoT device controls data hosted on a cloud-based storage service, NAS, and/or SAN storage, and/or the security risk comprises a suspicious or unauthorized data access from a remote device or from inside of the computing device.

In a further aspect, a system for data protection comprises: a computing means for validating integrity of a computing device, authenticating the computing device to communicate with the storage device; and taking over control of the storage device in response to detecting a security risk to at least one of the computing device and the storage device.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Certain concepts and terms used in the specification are provided below.

As used herein, the term "Root of Trust (RoT)" is used to describe a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HRoT)" device is used to describe a hardware device that provides RoT functions. The HRoT device generally provides, but is not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

As used herein, the term "Secure Encrypted Drive (SED)" is used to describe a storage device, such as a hard drive, that comprises a circuit built into a controller module of the storage device such that the controller module encrypts data to the storage media and decrypts the data from the media automatically without interacting with an external device. The technology is also referred as "Self-Encrypting Drive (SED)" or "Hardware-based Full Disk Encryption (FDE)."

Figure 1:
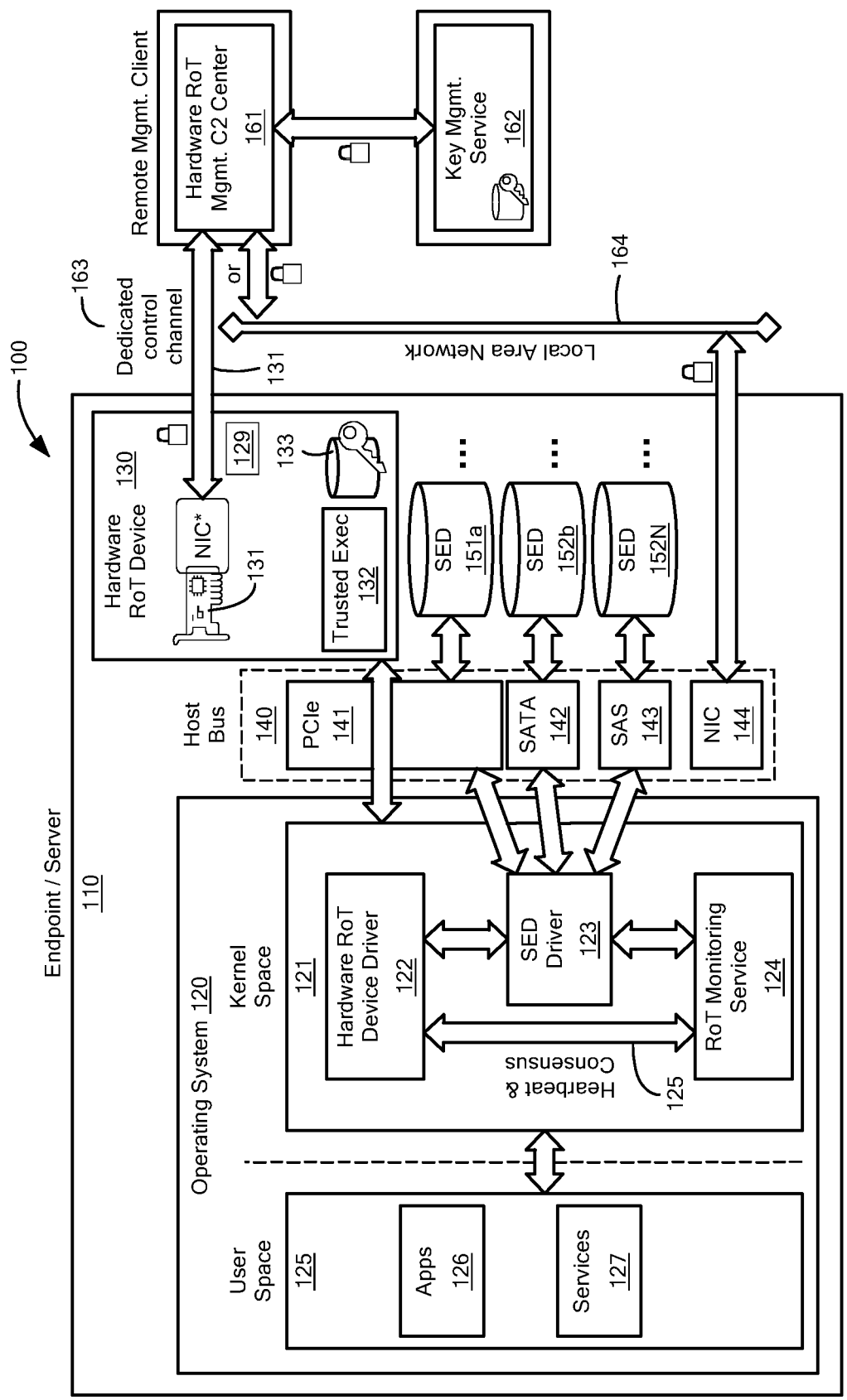
FIG. 1 is a block diagram of an illustrative data protection platform according to the concepts described herein.

Referring now to FIG. 1, a platform 100 providing access control of secured encrypted drives may comprise one or more computing devices 110. In embodiments, the computing device 110 may comprise an endpoint device (e.g., a desktop, laptop, tablet) or a server (e.g., enterprise server, database server, cloud server). The computing device 110 may include a processor (not shown) and a memory (not shown). In addition, the computing device 110 may include a Hardware Root of Trust (HRoT) device 130, one or more Secure Encrypted Drives (SEDs) 151a, 151b, ... 151N.

The computing device may operate an operating system (OS) 120 on the processor and the OS may communicate with the HRoT device 130 and the one or more SEDs 151a, 151b, 151N via a host bus. Particularly, the OS 120 may communicate with the HRoT 130 through an HRoT device driver 122 and with the SEDs through an SED driver 123 respectively. In embodiments, the HRoT device driver 122 and the SED driver 123 may communicate with an RoT monitoring service 124. The RoT monitoring service 124 may exchange a heartbeat signal with the HRoT device driver 122 to maintain consensus (i.e., synchronize) 125 with each other. The HRoT device driver 122, SED driver 123 and the RoT monitoring service 124 may locate and operate in a kernel space 121 of the OS 120. The OS 120 may further include a user space 125, in which one or more apps 126 and/or one or more service processes 127 are loaded and executed.

In embodiments, the HRoT device 130 may comprise a secure storage card that contains a processer 129 having one or more cores and system-on-chip (SoC) memory. The HRoT device 130 further includes a network interface 131 and a secure key storage 133 to facilitate encryption of data exchanged with other components. The HRoT device 130 may provide a dedicated and isolated network interface for remotely interfacing with the protected storage device. The architecture of an HRoT device (e.g., 130) and a computing device (e.g., 110) will be described below in detail in conjunction with FIG. 2.

In embodiments, the HRoT device 130 may further provide a Trusted Execution Environment (TEE) 132 inside of the HRoT device 130. The TEE 132 may run in parallel with the operating system 120, in an isolated environment. The TEE 132 may provide protection for the code and data loaded in the TEE 132 with respect to confidentiality and integrity. By loading authenticated threat monitoring and inferencing code (e.g., an artificial intelligence-powered anomaly detection application) directly into the (TEE), the HRoT device 130 can monitor the integrity of the computing device 110. This capability may enable the HRoT device 130 to closely monitor the host device 110 and the attached SEDs 151a, 151b, ... 151N, including their I/O activities. The HRoT device 130 then may make decisions autonomously or semi-autonomously and automatically issue SED commands to protect the SED if a malicious drive activity (e.g., a Ransomware attack) is detected without having to rely on a remote monitoring system or a human operator. Accordingly, the system's reaction time to a security risk can be shortened compared to conventional systems, thus reducing (preferably minimizing) the risk of data loss or corruption further.

The HRoT device 130 and the SEDs 151a, 151b, ... 151N may communicate with the OS 120 via a host bus 140. In embodiments, the host bus 140 may comprise a network interface based upon, but is not limited to, a Peripheral Component Interconnect Express (PCIe) 141, Serial Advanced Technology Attachment (SATA) 142, Serial Attached SCSI (SAS) 143, or network interface controller (NIC) 144. In some embodiments, computing device 110 may use a combination of the technologies. As can be appreciated by a person in the pertinent art, the computing device 110 may use any other network interface that provides a secure communication channel.

The HRoT device 130 may securely manage communications of the SEDs 151a, 151b, ... 151N. In order to securely manage the SEDs, the HRoT device 130 performs the following operations. First, the HRoT device 130 validates the integrity of the system 100 by verifying platform firmware, operating system firmware, and operating system kernel. In embodiments, the HRoT device 130 verifies the integrity of the system 100 during boot-up of the system 100. Once boot-up is done without any integrity issue, a security monitoring application (e.g., security monitoring application 216 in FIG. 2) may be launched and provide continuous monitoring of the system 100, including a kernel-level monitoring. In embodiments, the HRoT device 130 and the security monitoring application may work in tandem (i.e., work together) serve as a watchdog for each other. The secure collaboration between the HRoT device 130 and the security monitoring application would allow security monitoring application to share OS-level and application-level observations that the HRoT device 130 does not have access to/visibility in. Accordingly, the security monitoring application could share intelligence with the HRoT device 130 and provide an early warning capability and vice versa.

When the integrity of the system 100 is validated, the HRoT device 130 authenticates that execution commands directed to the SED are from a known and trusted source. In embodiments, these execution commands may come from an authenticated system including, but is not limited to, a remote Command and Control system (e.g., a Security Incident & Event Management (SIEM) system) or a security monitoring application (e.g., 216 in FIG. 2). Alternately, the execution commands may be generated internally by an Artificial Intelligence (AI) threat monitoring algorithm that is running within a Trusted Execution Environment (TEE) inside of the HRoT device 130. The commands would be encrypted and sent over an encrypted channel, which provides a two-level protection. In embodiments, digital certificates and protocols such as Transport Layer Security (TLS) and Public Key Infrastructure (PKI) may be used to implement authorization and authentication of the commands. In embodiments, the commands could be received via a Permissioned Blockchain. The Permissioned Blockchain technology may be integrated with the commands to provide secure transaction logging, validating the commands, and enabling distributed multi-HRoT consensus building and trust extension.

The HRoT device 130, then, facilitates the delivery of the commands to the SED within a protected channel, such as a physically controlled channel or within the kernel code that was verified previously. The HRoT device 130 continues to monitor the integrity of the system 100. When system 100 is trusted, the HRoT device 130 allows updates to the SED to be performed. In embodiments, the HRoT device 130 may integrate with a Trusted Platform Module (TPM) to interface with the SED.

The system 100 may further include a Command and Control (C2) management center for HRoT 161 that communicates directly with the HRoT device130 in the computing device 100. HRoT C2 management center 161 may provide additional monitoring capability to the HRoT device 130. In embodiments, the HRoT C2 management center 161 may validate and authenticate the HRoT device 130, which provides additional protection to the system 100 because the HRoT C2 management center 161 is not under control of the system 100. In embodiments, the HRoT C2 management center 161 may communicate with the HRoT device 130 through a dedicated secure control channel 163, such as a PCIe bus, or through local area network (LAN) interface. Furthermore, the HRoT device 130 can exchange SED encryption key periodically through the HRoT C2 management center 161 and an associated, trusted key management service 162. Deploying a new SED encrypting key that is exchanged from the trusted key management service 162 will increase the security level of the system 100.

In embodiments, the HRoT device 130 may perform its operations, including the SED-related actions, autonomously, on-demand, or based on sequence of events which are pre-defined by, for example, an administrator of the system 100.

In embodiments, the system 100 for controlling SED based on the HRoT device 130 can be further enhanced by incorporating a kernel-level Software-based Root of Trust (SRoT) service. The HRoT device 130 may inject a software-based RoT and a kernel-level monitoring service into the boot-up sequence of the system 100 via an option ROM and extending trust from the HRoT to the SRoT service, which prevents for an adversary to "shim" in (i.e., inject and execute any code) before the RoT is loaded and running. Accordingly, the HRoT and SRoT may provide additional OS-and application-level integrity checks and cross-validation that is beyond the reach of the HRoT's monitoring capabilities. In embodiments, the HRoT device 130 and the SRoT service may monitor the integrity of the others. When the integrity of either the SRoT or HRoT appears to be compromised, the surviving party could issue a predefined sequence of secure (self-defense) drive operations, such as issuing a system alert to a Security Incident & Event Management (SIEM) system and/or locking down the SEDs 151a, 151b, . . . 151N to protect data stored in the SEDs. Furthermore, a consensus voting process may be implemented between the SRoT and HRoT for non-reversible SED transactions (e.g., wiping-out a storage device). The consensus voting process will require approvals from both of SRoT and HRoT, which provides additional protection for the non-reversible SED transactions.

In embodiments, the software-based RoT may comprise or be replaced by a Trusted Service, which monitors security of the computing device after an early stage of the booting sequence with the computing device has passed. That is, the software-based RoT (or a replacement application) may monitor the HRoT device and the computing device after the booting of the system is done.

In embodiments, the HRoT device 130 may switch a mode of the SEDs shortly (preferably instantaneously) into a decoy mode at a hardware-level when a security risk is detected due to an outside attack or by an insider threat.

In embodiments, the HRoT device 130 may control data hosted on a cloud-based storage service, such as Amazon Simple Storage Services (Amazon S3). For example, the HRoT device 130 could be included into a server that runs an enterprise's Cloud Access & Security Broker (CASB) software. When a threat is detected on the CASB server, the HRoT device 130 may trigger a lockdown of cloud-hosted data and prevent its data access. In embodiments, the HRoT device 130 may be allowed to connect to the cloud service provider's (e.g., Amazon Web Services) Identity & Access Management service, which allow the HRoT device 130 may change cloud folder or object access rights, or selectively revoke access for specific users or applications.

Figure 2:
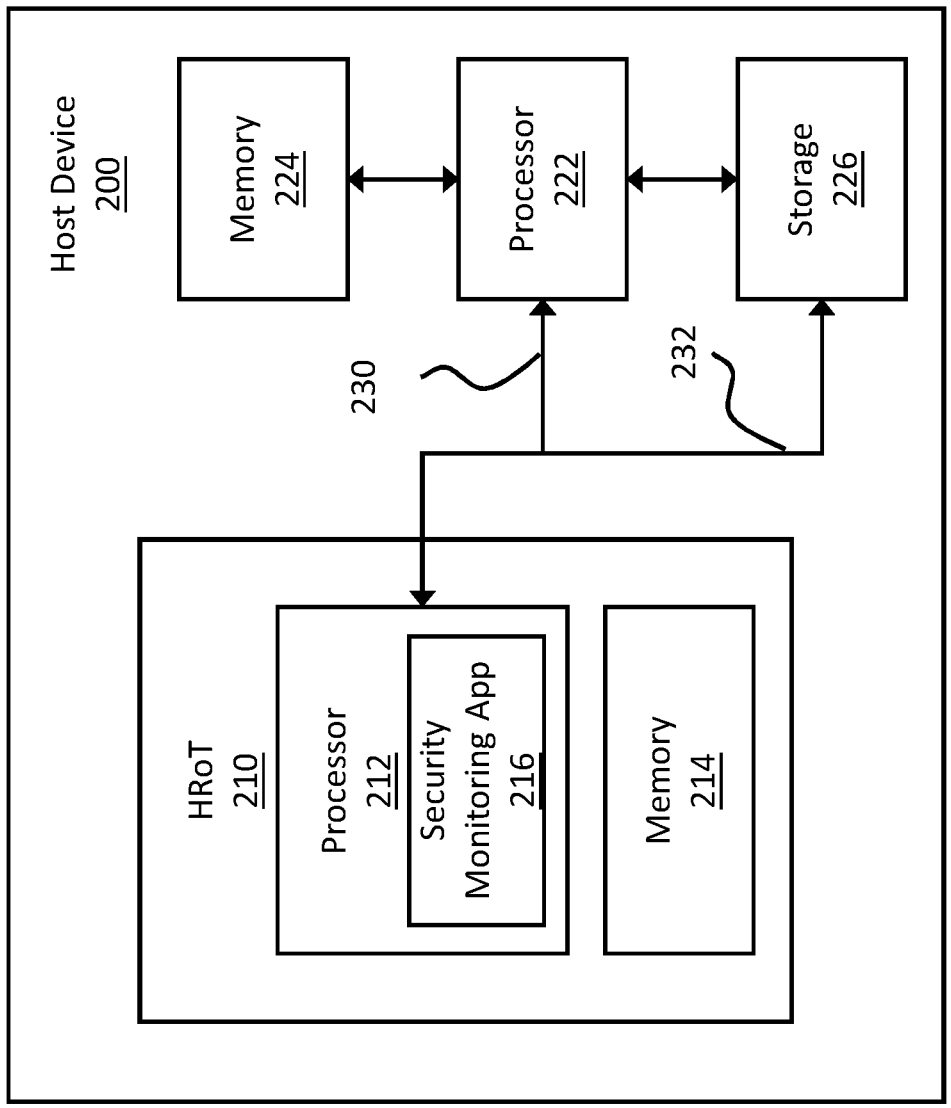
FIG. 2 is a block diagram showing an architecture of a Hardware Root of Trust (HRoT) device according to the concepts described herein.

Referring now to FIG. 2, an illustrative host device 200 (e.g., endpoint/server 110 in FIG. 1) may include a Hardware Root of Trust (HRoT) device 210. The HRoT device 210 may include a multi-core processor 212 and memory 214. The host device 200 may include a processor 222, memory 224, and a storage device 226 in addition to the HRoT device 210. The HRoT device 210 may be connected to the processor 222 via a connection interface 230. In addition, The HRoT device 210 may be connected directly to the storage device 226 via a connection interface 232.

The HRoT device 210 comprises a security device that provides a set of functions that are trusted by other modules in a computing environment. The processor 212 of the HRoT device 210 may include one or more cores (not shown). The processor 212 may also include a boot read-only memory (ROM), on-chip memory, and programmable logic (PL). A processor (e.g., 212) of an HRoT device generally requires higher security features than a typical processor being used in a system that does not require higher security.

In embodiments, the HRoT device 210 may load and execute a security monitoring application 216. The security monitoring application 216 may provide a 'tamper detection mechanism' by intercepting events such as voltage changes, clock skewing, and/or Joint Test Action Group (JTAG) connection for example. In embodiments, the JTAG connection connects to an on-chip test access port (TAP) of a chip and may access a set of test registers to test various parts of the chip and detect issues with the chip, for example, a circuit fault. The security monitoring application may also monitor inputs and outputs to/from the system. The security monitoring application validates the current state of the hardware (e.g., the host device 200), and upon successful validation of the hardware, boot sequence of the hardware may continue.

In embodiments, the connection interface 230 may comprise a secure connection. In some embodiments, the connection interface 230 comprises a PCIe bus, which provides Direct Memory Access (DMA) capability. Accordingly, the HRoT device 210 may access the memory 214 directly to validate and authenticate the host device 200. In embodiments, the connection interface 232 between the HRoT device 210 and the storage device 226 may comprise a PCIe bus. Accordingly, the HRoT device 210 may control behaviors (lock, unlock, erase drive or specific folders or files) of the storage device via the connection interface 232 using SED (OPAL standard-provided) commands. In embodiments, the storage device 226 may be a cloud-based storage device, such as Amazon Simple Storage Services (Amazon S3), which is hosted on a different computing device. For example, the HRoT device may communicate with a NAS, SAN, or Cloud Storage Identity & Access Management system to change access control policies on the fly. In addition, security risk detection is not limited to what embodiments of a HRoT can detect itself. For example, tools such as FORCEPOINT Behavioral Analytics and Data Loss Prevention can generate alerts upon which a HRoT device can act.

The HRoT device 210 may also monitor the storage device 226, such as a secure encrypted drive (SED) (e.g., 151a, 151b, . . . 151N in FIG. 1). The security monitoring application that is loaded and executed in the HRoT device 210, preferably in a Trusted Execution Environment (TEE) (e.g., TEE 132 in FIG. 1) may monitor communications (e.g., I/O activities) of the storage device 226 through the connection interface 230. When it is determined that there is a security risk with the host device 200 and/or the storage device 226, the HRoT device 210 may take over the control of the storage device 226 and lock down the storage device 226 to protect data stored in the storage device 226.

In embodiments there can be a variety of criteria for identifying security risks. For example, in a ransomware attack there may be detection of above normal storage media I/O access patterns, e.g., ransomware process starting to encrypt the entire drive. In addition, there may be an insider trying to access storage media outside regular business hours. Also, security risk may be identified by modification of storage device driver software or controller firmware. In example embodiments, a security risk can be identified by the modification of any critical software on the system. In embodiments, as part of a provisioning process and/or platform configuration settings, a HRoT device can securely hash and store all kinds of host system- and HRoT-related configuration meta data (e.g., BIOS, Firmware, Host OS, and host application versions, etc.) in its secure onboard storage, which it then can use to periodically validate system integrity at run-time. Any deviations from the expected baseline configuration can be interpreted as a security risk, which may cause the HRoT to auto-lock all storage systems. This behavior would be configurable and depend on the use case scenario(s).

The features described above in conjunction with FIG. 2 are based upon an HRoT device 210. As can be appreciated by a person in the pertinent art, substantially similar or the same features may be provided by a software-based RoT instance running on the host device 200.

Figure 3:
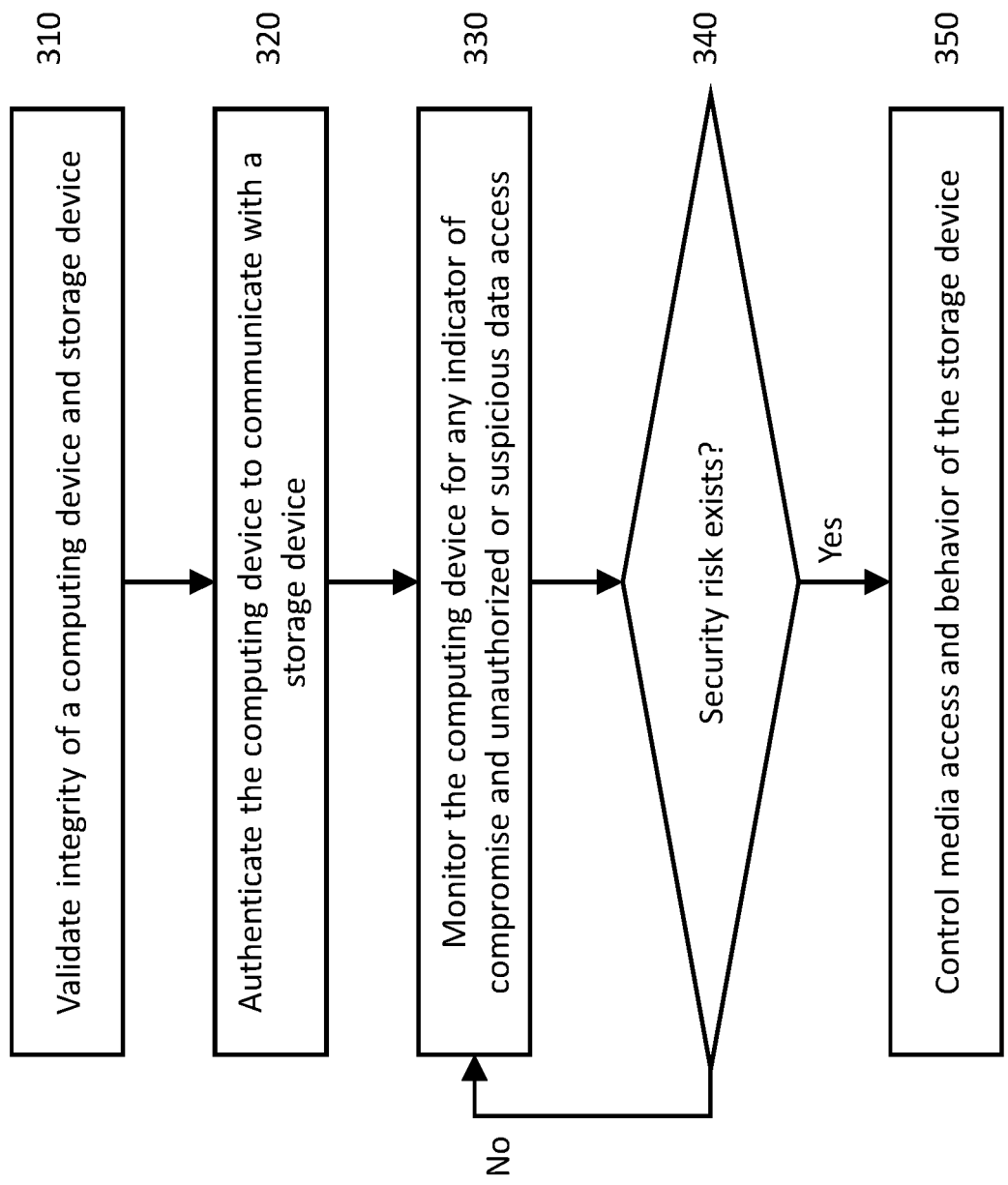
FIG. 3 is a flowchart of a process for data protection according to the concepts described herein.

FIG. 3 is a flow diagram illustrating the processing performed by a system (e.g., the system 100 shown and described above in conjunction with FIG. 1). Rectangular elements (typified by element 310 in FIG. 3), herein denoted "processing blocks," represent computer software instructions or groups of instructions and diamond shaped elements (typified by element 340 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a process 300 for monitoring security and protecting data storage includes processing block 310 in which a Hardware Root of Trust (HRoT) module (e.g., HRoT device 130 in FIG. 1) validates integrity of a computing device (e.g., host device 110 in FIG. 1) and a storage device (e.g., SED 151a in FIG. 1). In embodiments, the HRoT device validates the computing device and the storage device by verifying platform firmware, operating system firmware, and operating system kernel. When the integrity of the system 100 is validated, processing may then proceed to processing block 320, in which the HRoT device 130 authenticates that execution commands directed to the SED is from a known and trusted source. In processing block 330, the HRoT device may monitor the computing device (e.g., 110 in FIG. 1) for a safety risk (e.g., indicators of compromise and unauthorized or suspicious data access). In addition, the HRoT device may deliver commands, particularly SED commands, that are directed to the storage device from a remote HRoT C2 system (e.g., 161 in FIG. 1). In embodiments, the HRoT device may monitor data received by and sent from the computing device and storage device. Furthermore, the HRoT device may monitor the integrity of the computing device and storage device by a security monitoring application that is loaded and executed in a Trusted Execution Environment (e.g., 132 in FIG. 1) in the HRoT device. In other embodiments, the RoT/HRoT may utilize any other suitable methods to monitor the security of the computing device and storage device.

In decision block 340, the HRoT device determines whether there is a security risk to the computing device and storage device. If, in decision block 340, it is determined that there is a security risk, processing may proceed to processing block 350, in which the HRoT device controls media access and behaviors of the storage device. For example, the HRoT device may block any communication (i.e., lock out) the storage device to protect data stored in the storage device. In embodiments, the HRoT device may issue an SED OPAL lock command to the drive to lock out the storage device. In addition, the HRoT device may issue a wipe-out command to delete data from the storage device. When it is determined that there is no safety risk, the HRoT device may issue an unlock command to reverse the lock out. Further, the HRoT device may switch the mode of the storage device to a decoy mode when a security risk is detected. If, in decision block 340, it is determined that there is no security risk, processing may proceed to processing block 330 in which the HRoT device continues monitoring the computing device for any indicator of compromise and unauthorized or suspicious data access.

In contrast to endpoint security and management solutions, such as Microsoft System Center that have the ability to isolate a device from the network and prevent use of enterprise services like printing, copying data to a USB-connected flash memory stick, etc. upon detection/reporting of a security risk, example embodiments of the invention, such as a HRoT can take over control of the storage media locally and at the lowest possible level (via the SED OPAL protocol) instead of having to rely on a remote security operations center (SOC). For example, if an attacker disconnects a laptop or desktop from the network prior to mounting an attack, there is nothing a conventional endpoint protection solution that relies on a backend SOC analytics engine and remote command & control to tell it what to do next can do to protect the attached storage media. With example embodiments of a local HRoT in the loop that has its own, secure execution environment that is completely independent of the host system, and thus not affected by conventional host-/app-/user-level attacks, the HRoT can act as the last line of storage system defense. For example, it can enter into a self-defense/protection mode and lock down all attached storage media if the system gets disconnected or under attack.

Figure 4:
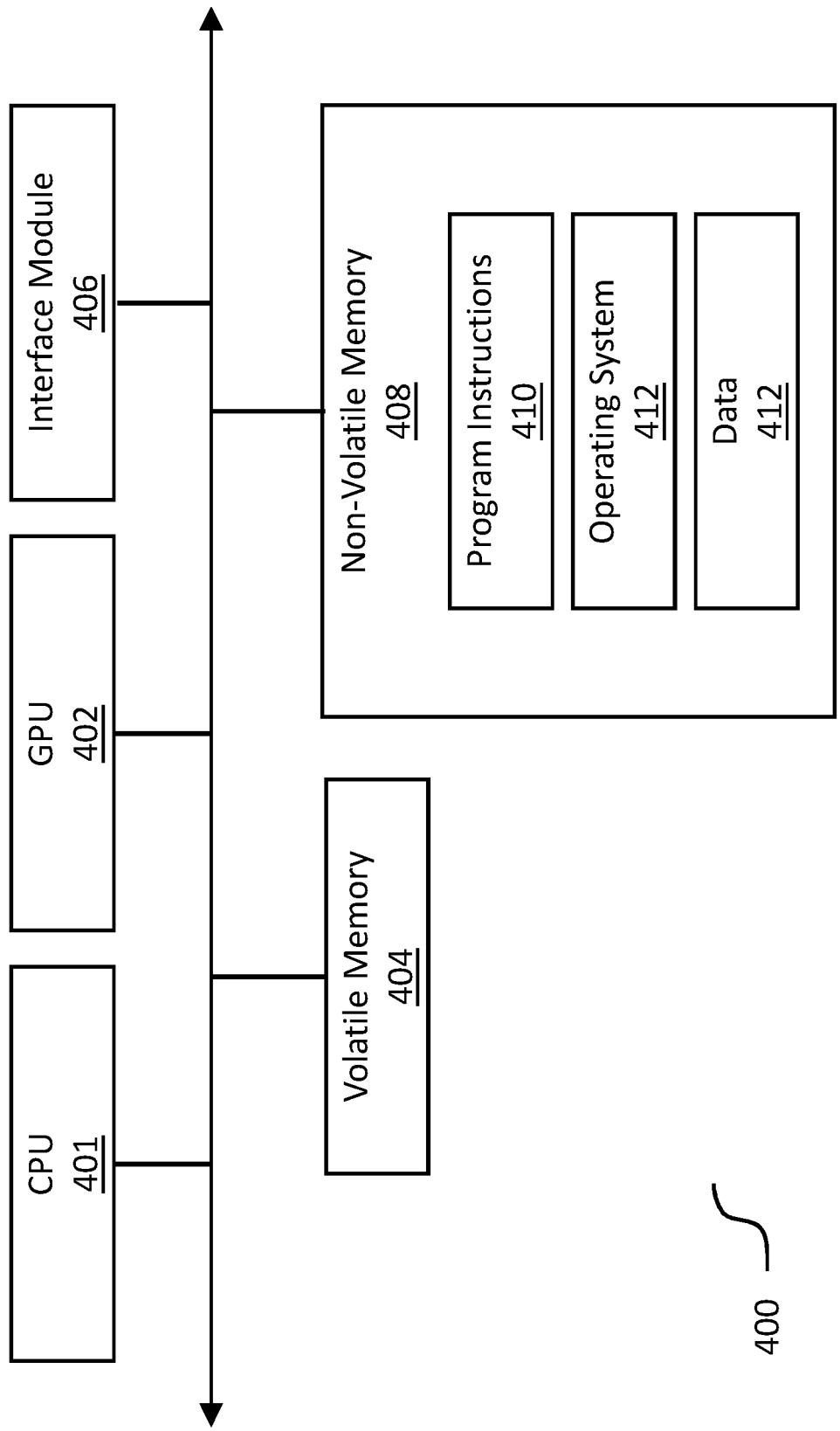
FIG. 4 is an illustrative implementation of a security system described in FIG. 1 according to the concepts described herein.

Referring now to FIG. 4, an illustrative implementation of a processing device 400 which may be suitable to implement the processing techniques described herein includes a processor 402, a volatile memory 404, a non-volatile memory 408 (e.g., hard disk) and the interface module 408 (e.g., a user interface, USB interface and so forth). The non-volatile memory 408 stores computer instructions 412, an operating system 418 and data 418. In one example, the computer instructions 412 are executed by the processor 402 out of volatile memory 404 to perform all or part of the processes described herein (e.g., processes 300).

The processes described herein (e.g., process 300) is not limited to use with hardware and software of FIGS. 1-2; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A system for data protection, the system comprising:
a computing device comprising a processor, a Hardware Root of Trust (HRoT) device, and a storage device;
wherein the HRoT device is configured to inject a Software Root of Trust (RoT) instance configured to run on the processor and send an alert signal to the HRoT device in response to detecting a security attack to at least one of the computing device and the storage device, the SRoT instance being different than the HRoT, and wherein the HRoT device and the SRoT instance operate to:
validate integrity of the computing device;
authenticate the computing device to communicate with the storage device; and
take over control of the storage device in response to detecting a security risk to at least one of the computing device and the storage device.

2. The system of claim 1, wherein the HRoT device validates integrity of the computing device by validating one or more of a firmware of the computing device, a firmware of operating system running on the computing device, and a kernel space of the operating system.

3. The system of claim 1, wherein the HRoT device provides a Trusted Execution Environment (TEE).

4. The system of claim 3, wherein the HRoT device loads and executes a security monitoring application in the TEE.

5. The system of claim 1, wherein the HRoT device, in response to detecting a security risk to at least one of the computing device and the storage device, blocks communication of the storage device.

6. The system of claim 1, wherein the storage device comprises a Secure Encrypted Drive (SED).

7. The system of claim 1, wherein the HRoT device controls data hosted on a cloud-based storage service, NAS, and/or SAN storage.

8. The system of claim 1, wherein the security risk comprises a suspicious or unauthorized data access from a remote device or from inside of the computing device.

9. A method of protecting data, comprising:
employing a computing device comprising a processor, a Hardware Root of Trust (HRoT) device, and a storage device,
wherein the HRoT device is configured to inject a Software Root of Trust (RoT) instance configured to run on the processor and send an alert signal to the HRoT device in response to detecting a security attack to at least one of the computing device and the storage device, the SRoT instance being different than the HRoT, and wherein the HRoT device and the SRoT instance are operable to perform a process comprising:
validating integrity of the computing device;
authenticating the computing device to communicate with the storage device; and
taking over control of the storage device in response to detecting a security risk to at least one of the computing device and the storage device.

10. The method of claim 9, wherein the HRoT device validates integrity of the computing device by validating one or more of a firmware of the computing device, a firmware of operating system running on the computing device, and a kernel space of the operating system.

11. The method of claim 9, wherein the HRoT device provides a Trusted Execution Environment (TEE).

12. The method of claim 11, wherein the HRoT device loads and executes a security monitoring application in the TEE.

13. The method of claim 9, wherein the HRoT device, in response to detecting a security risk to at least one of the computing device and the storage device, blocks communication of the storage device.

14. The method of claim 9, wherein the HRoT device controls data hosted on a cloud-based storage service, NAS, and/or SAN storage.

15. The method of claim 9, wherein the security risk comprises a suspicious or unauthorized data access from a remote device or from inside of the computing device.

* * * * *